United States Patent [19]

Takahashi

[11] Patent Number: 5,245,162
[45] Date of Patent: Sep. 14, 1993

[54] METHOD FOR DETERMINING SEQUENCE OF ARRIVAL AND RACING TIME OF RUNNERS AT FINISH LINE BY USE OF BAR CODES

[76] Inventor: Kazuo Takahashi, 225-2, Idenawa, Hiratsuka-shi, Kanagawa-ken 254, Japan

[21] Appl. No.: 627,100

[22] Filed: Dec. 13, 1990

[30] Foreign Application Priority Data

Dec. 15, 1989 [JP] Japan .................................. 1-325298
Sep. 28, 1990 [JP] Japan .................................. 2-260257

[51] Int. Cl.⁵ .............................................. G06K 7/10
[52] U.S. Cl. ..................................... 235/377; 235/385; 346/107 B; 368/2
[58] Field of Search .......... 346/107 B; 368/2; 235/380, 384, 385, 382, 377

[56] References Cited

U.S. PATENT DOCUMENTS

| | | | |
|---|---|---|---|
| 4,449,114 | 5/1984 | Fascenda et al. | 364/460 |
| 4,501,958 | 2/1985 | Glize et al. | 235/382 |
| 4,555,618 | 11/1985 | Riskin | 235/384 |
| 4,571,698 | 2/1986 | Armstrong | 368/2 |
| 4,752,764 | 6/1988 | Peterson et al. | 346/107 B |
| 4,806,743 | 2/1989 | Thenery | 235/472 |
| 4,831,388 | 5/1989 | Yamanaka | 346/95 |
| 4,958,064 | 9/1990 | Kirkpatrick | 235/384 |
| 5,101,200 | 3/1992 | Swett | 235/454 |
| 5,103,433 | 4/1992 | Imhof | 346/107 B |

FOREIGN PATENT DOCUMENTS 1248290 10/1989 Japan .................................. 235/494

Primary Examiner—Eugene R. LaRoche
Assistant Examiner—Christopher R. Glembocki
Attorney, Agent, or Firm—Armstrong, Westerman, Hattori, McLeland & Naughton

[57] ABSTRACT

A method for determining the sequence of arrival or the racing time of a large number of participants in the track and field events, the method comprising steps of bar-coding a racing number of each participant; causing a bar-code label to be carried by each participant; sequentially reading, by a bar-code reader, the racing number on the bar code label carried by each participant who has passed the finish line; and introducing, as inputs, into a computer with timers being incorporated therein, those data as read by the bar code reader.

2 Claims, 2 Drawing Sheets

METHOD FOR DETERMINING SEQUENCE OF ARRIVAL AND RACING TIME OF RUNNERS AT FINISH LINE BY USE OF BAR CODES

This invention relates to a method for deciding racing time and sequence of arrival in the field and track events, and, more particularly, it is concerned with a method for determining arrival time of each and every runner in a running race to be held by participation of a large number of runners as in the marathon, etc., or a method for determining sequence of arrival of the participants from the racing time of each of them.

It has heretofore been a practice in the field and track events that, since the number of participants in the games (i.e., runners) are relatively small, the racing time and sequence of their arrival at the finishing point were measured and decided by relatively small number of judges with use of manual watches or electronic watches, or through their visual observations. In the case, however, of marathon where a large number of runners take part in the competition (it is not rare in recent years that marathons are held in a scale with the participants counting as many as several thousands to a few tens of thousands), it has become almost impossible to measure the arrival time and decide the sequence of arrival of each and every runner participated in the race with such small number of judges. As the conventional methods for tabulating the arrival time and the sequence of arrival of the runners who took part in the track and field events of such large scale, there is one, in which the competition judges standing-by at the finish line read a racing number label placed on each of the runners and record the racing time (time taken from the start to the finish); or there is one, in which a removable part is provided on the racing number label, in which the name of the runner is entered in advance, and the part is removed and recovered from each runner arriving at the finish line one after the other, thereby deciding the sequence of arrival; or there is one, in which a fixed number assigned to each participant is signalized to be transmitted by an emitter and received by a receiver in the form of light or electromagnetic waves (vide: Laid-Open Japanese Patent Application No. 2-2002809).

The abovementioned conventional methods, except for the one as disclosed in the Laid-Open Japanese Patent Application No. 2-200280, have their disadvantages such that not only a large number of competition judges are needed, but also accurate sequence of arrival and racing time of each runner cannot be decided. In particular, in the case of a large-scaled marathon event, it takes place very frequently that a plurality of runners come into the finish line in group, in which case it becomes much more difficult to measure the accurate racing time and decide the sequence of arrival of each runner. On the other hand, the abovementioned method of transmitting and receiving the fixed racing number of each of the runners as signalized in the form of light or electromagnetic waves requires special apparatuses and appliances to process the signalized information, which is not only inconvenient in their acquisition, maintenance, repair and so on, but also an electronic device or appliance carried by each runner may possibly get out of order.

Further, in the above-described conventional method, a great deal of manpower and time were required for disposing of complicated and troublesome clerical works, covering reception of the application for entry of the competition from each candidate, delivery of the racing number for each runner on the spot, and so forth. That is to say, in the conventional marathon event, it has been done that only the racing number is notified from the sponsor to each candidate for the entry, hence much time is taken for finding out the racing number tag for each participant, and handing it over to him (or her) at the reception desk on the day when the sports event is held. Since, in this case, a large number of participants in the competition rush to the reception desk at the site and want to complete the registration procedures in a very short period of time, the amount of work to search out the individual racing number tag becomes enormous, which has been one of the great problem in the management and operation of this kind of sport meeting.

In view of the abovementioned point of problem, the present invention has been made with the aim of providing an improved menthod for accurate and efficient determination of the arrival time of the participants at the finish line.

As the means for solving the existing problem, the present invention provides a method for determining the racing time of participants in the running competition who have passed the finish line, wherein a bar-coded label of the racing number is given to each of the participants to be carried by them; then the start numbers of the participants who passed through the finishing spot of the competition are sequentially read out from the bar-coded labels by means of a bar-code reader; and the thus read out data are introduced as inputs into a computer incorporating therein timers, thereby determining the sequence of arrival or racing time of each of the participants in the competition in the sequence of their arrival.

In order to determine the accurate racing time, it is desirable to adopt a method, in which a timer-stopping signal is transmitted to the computer which incorporates therein a timer, at every time the participant runners pass the finish line, to store therein the racing time; and then the racing number for each of the runners is read sequentially, and the racing time as stored is made the accurate racing time. Explaining this method in more detail, it consists of introducing beforehand, as an input, into a computer an idle running time, during which average runners sequentially run through an idle running zone, located at the spot after the finish line, subsequent to their passing the finish line; transmitting and storing a timer-stopping signal to and in the computer which incorporates therein timers in number substantially corresponding to the number of the participant runners, when they pass the finish line; thereafter reading out sequentially by means of bar-code readers, at a bar-code reading spot provided at the end of the idle running zone, the racing number in the form of bar code label carried by each of the participant runners; storing in the computer the time as read and the racing numbers; and selecting the accurate arrival time from a group of time constituted with the abovementioned racing time as stored in the computer and the time obtained from subtraction of the abovementioned idle running time as stored in the computer, in such a manner that the number of the participant runners who passed the finish line coincides with the number of the runners who passed the bar code reading spot, and that the sum of the racing time and the idle running time becomes substantially equal to the abovementioned time as read, thereby deciding the actual racing time of each and every participant runner.

One embodiment of the present invention will be described in detail hereinbelow, starting from the entry proceeding of the candidates to participate in the running competition, and onward, with reference to the accompanying drawing, in which.

Figure 1:
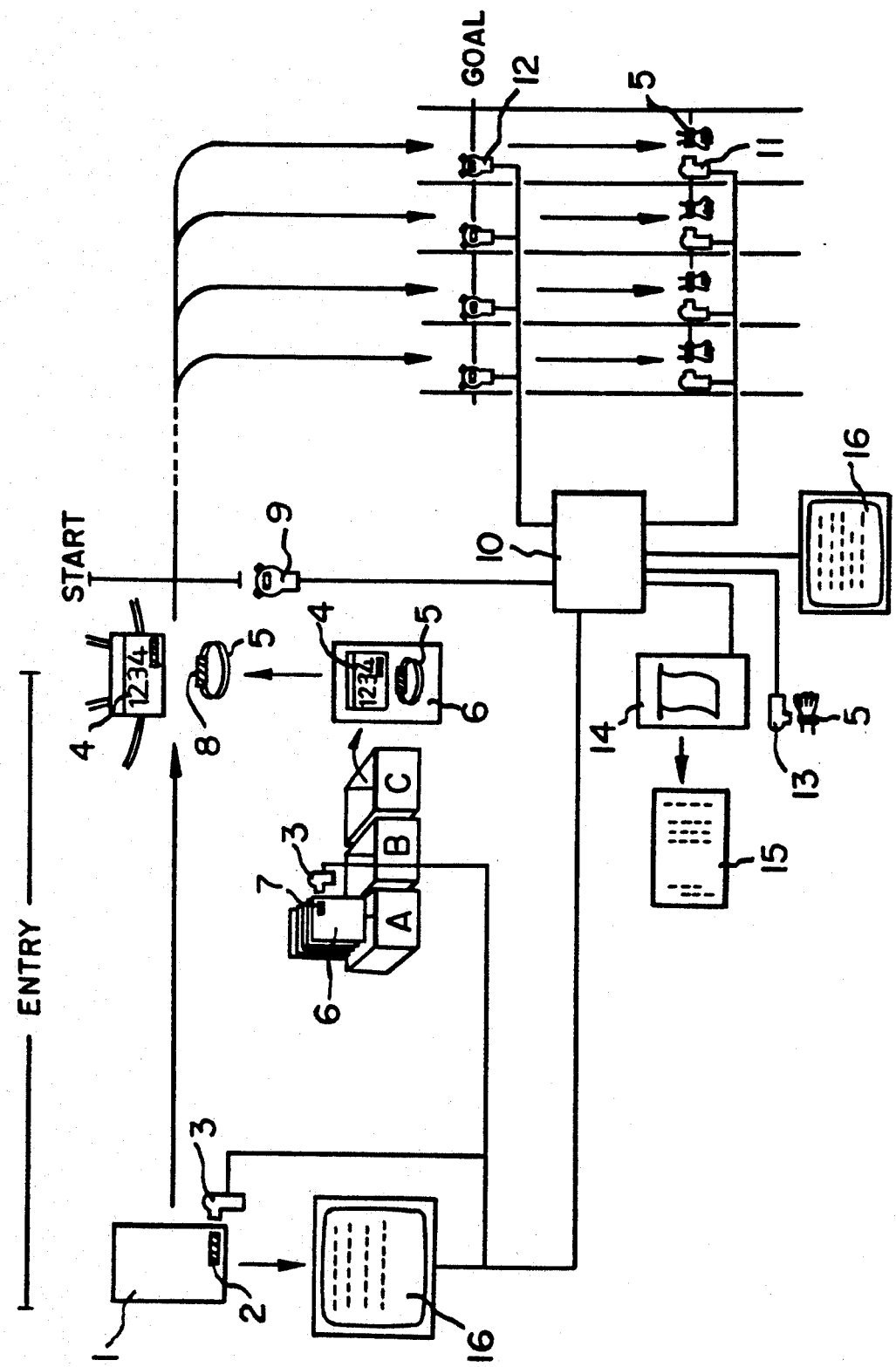
FIG. 1 is an explanatory diagram showing the preferred embodiment of the present invention, from the entry proceeding of the candicate runners to finish of the competition.

FIG. 1 is an explanatory diagram showing the entire flow of the way, in which the sports event is conducted, including of the method of its management and operation according to the present invention. An entry card 1 shown in the drawing is forwarded, in the following manner, from the sponsor of the sports event to those who want to participate in the event. Those who actually participate in the sports event out of those who want to take part in it (hereinafter called "participant") bring in with them (or her) the entry card 1 on the day when the event is held. At the outset, those who want to take part in the event make application to the sponsor of the event (secretariat) either by telephone or by mail, to whom an application form (such as a return post card with entry number stamped on it) is mailed from the secretariat. Each applicant then fills in the application form with necessary particulars (name, date of birth, sex, age, his (her) best racing time, etc.) and mail it back to the scretariat, who examines the entries in the written application, confirms payment of the participation fee, and so forth. If and when everything is found in order, a fixed registration number is assigned, and then the number is stored as an input into a host computer together with various other data of the participant, such as name, age, sex, best racing time, etc., on the basis of which a bar code 2 (a fixed registration number as codified of each and every participant) is prepared. Depending on the case, the participants are grouped according to the level of their best racing time, in which case designation of the group such as "Group A", "Group B", "Group C", etc. will be added. The bar code 2 is attached onto the entry card shown in FIG. 1, and is mailed to those who want to take part in the event.

Figure 2:
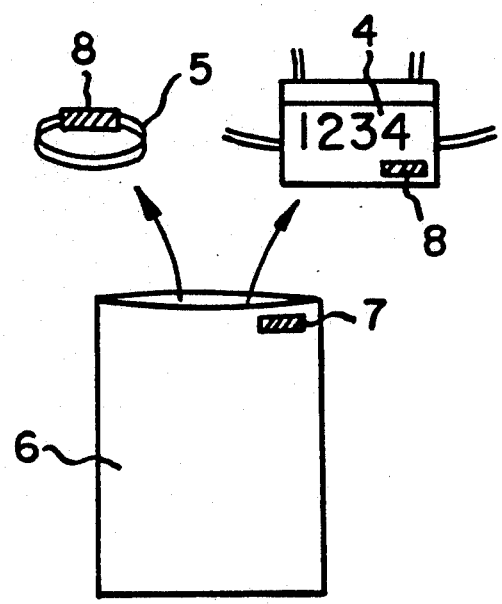
FIG. 2 is a schematic diagram showing a kit for the bar-coded racing number tag, the racing number label, and an envelope to contain such tag and label.

On the day of the sports event, the sponsor receives at the reception desk the entry card 1 which the participant brings in, and causes the bar code 2 attached on the entry card 1 to be read by a bar code reader 3 connected to the host computer 10. In this case, various data of the participant as previously stored in the host computer 10 may be verified by a monitor television 16. The sponsor makes preparation, before the day when the sports event takes place, of an envelope 6, as shown in FIG. 2, which contains therein a racing number label 4 with the racing number being placed on it and a bar code tag 5, and gives out the envelope to each participant who brings in the abovementioned entry card 1. In this case, arbitrary racing number may be assigned to each of the participants, irrespective of his (or her) fixed registration number. At that time, there is attached on the surface of the envelope 6 a bar code 7 which is a codified racing number. By reading this bar code 7 through the bar code reader 3, the fixed registration number of the participant is associated with his racing number. By use of the bar code reader 3, the information stored in the bar code 7 can be read out in an extremely short period of time, hence the work of assigning the racing number to each of the particpants in the sports event can be highly simplified. Since, according to this method, association between the fixed registration number and the racing number of each participant can be done almost instantaneously by codification of these separate numbers in the form of the bar code, any racing number can be assigned to the participant in the sports event without any complication whatsoever. On account of this, troublesome work of searching out a particular racing number out of so many racing numbers, as experienced in the conventional method, becomes unnecessary.

The bar code tag 5 in the envelope 6 bears on it a bar code 8 containing the codified racing number for each participant (the substantially same information as that in the bar code 7 being contained therein). This bar code tag 5 is to be kept on the wrist of each participant to the competition from its start to its end. There is no difference at all from the conventional method to place the racing number label (usually made of cloth) on the chest of the participants. As an alternative, the bar code which is identical with the bar code 8 may be attached on the participants' chests. Also, as mentioned in the foregoing, the participants are grouped depending on the level of their racing ability (for example, those having the highest level of the racing time are grouped "A", then subsequently grouped in "B", "C", and so forth). In the case of assigning the racing number in the group-wise, the envelopes may be classified in each group of "A", "B", "C", etc. as shown in FIG. 1. The group, to which the participants belong may be determined by reading the abovementioned bar code containing therein the "group" designation through the bar code reader 3, and displaying the information on the monitor television 16, or by arranging the entry cards 1 in different colors for each group.

When a large number of participants in the race line up on the start line before start of the racing, with the racing number label 4 proper to each of them attached on the chest, there will be so many participants gathered at the start line in many folds, hence tremendous congestion. To avoid such congestion, particular areas may be designated for each group of participants in the racing at its start. Such particular area may be indicated on the racing number label, or be recorded beforehand in the entry card.

Simultaneously with start of the racing, the (electronic) watch is actuated to measure the racing time. The start of the watch may be done by a switch 9, a keyboard, etc. connected to the host computer 10 which incorporates therein an electronic timing instrument.

Arrival of the runners at the finish line may generally take fairly long hours, in a large competition, until the last runner arrives at the goal. It will also be anticipated that a large number of runners arrive at the finish line almost at the same time. In anticipation of such situation to take place, it may be advantageous to provide several gates at the finishing spot (for example, division may be made for a plurality of lanes). In the case of invited champions being included in the participant runners, an exclusive gate may be provided for them and their racing time is measured separately by the official judges standing-by at the gate. Other participant runners in general can choose, on his own choice, any of the plurality of gates to enter.

The racing time of each runner arriving at the finish line can be measured by reading of the racing number on the bar code tag 5 of each runner through the bar code reader 11 connected to the host computer 10 and carried by the judge standing at the goal (finish line). In so doing, the racing time and the sequence of arrival at the finish line of each participant runner can be instantaneously measured and decided by the host computer 10. The number of gates to be provided at the finishing spot may be arbitrarily determined by the size of the racing, i.e., by the number of the participants. (The same thing can be said of the number of bar code readers to be provided, and judges to operate the bar code readers). When the racing is in so large a scale that there is expected many runners to arrive at the finish line almost at the same time, there will possibly take place a situation such that the time when the runner arrives at the finish line does not accuartley coincide with the time read by the bar code reader from the bar code tag. Such inaccuracy may occur for the time of operation of the bar code reader, because the runners come into the finishing spot in group.

In such occasion, it will be preferable that, as shown in FIG. 1, the judges to read the bar code 8 with the bar code reader 11 stand at the forward spot from the finishing line so that they may be independent from those judges measuring the arrival time of the runners at the finish line.

In more detail, at the finish line, each judge on each lane holds the stop-watch 12 (to measure the racing time by stopping the electronic timing instrument incorporated in the host computer), and, when there is arrival of a runner, pushes the stop-watch once to transmit a signal to the host computer 10. The runner who has arrived at the finish line further moves forward in a certain distance from the finishing spot along his lane to an end spot where he (or she) has his racing number on the bar code tag 5 read out by another judge who is standing-by at that end spot holding the bar code reader 11. If there is no change in the sequence of arrival among the runners, it can be determined that to whom the time as measured belongs. When the abovementioned control system is adopted for each lane, difference in arrival time of the runners on the different lanes can be determined (it is determined by which one of the stop-watches on the lanes was pushed earlier). This difference determination system is designed to be controlled entirely by the computer program in the host computer 10.

Figure 3:
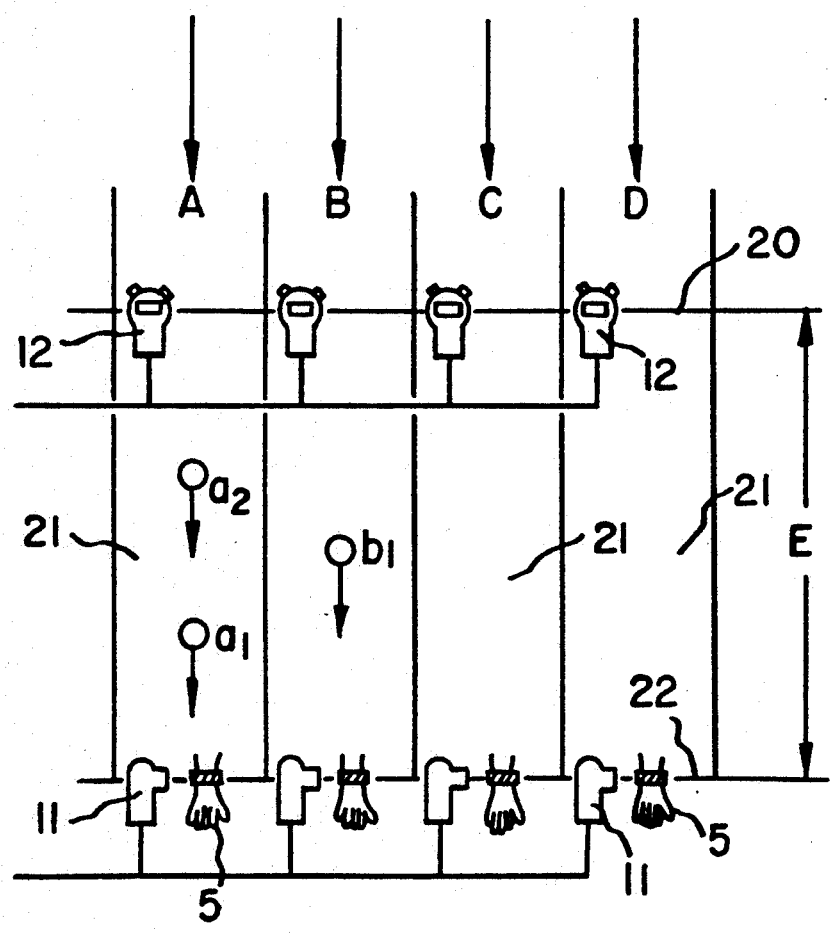
FIG. 3 is an explanatory diagram of the race finishing spot.

FIG. 3 shows the detail of the finishing spot, where the gates A, B, C and D are provided. At the forward spot from the finish line 20, there are idle running zones 21 continuing from the respective gates, and, at the end of the idle running zones, there are provided bar code reading spots 22. The idle running zones 21 may have an arbitrary distance E depending on the size of the racing and the number of participants. This idle running zone is the place, through which the runners who have passed the finish line 20 must continue to run, that is, the runners $a_1$, $a_2$ (who arrived at the gate A) and the runner $b_1$ (who arrived at the gate B) have still to run forward toward the bar code reading spots 22. During this idle running, the runners $a_1$, $a_2$, and $b_1$ should not change their sequence of running.

Since an average value of time, in which the runners who have passed the finish line continue to run through the idle running zones 21, must be determinable experimentally, the sponsor of the competition is able to set in advance the experimentally calculated time as the idle running time, which is introduced as an input into the host computer 10.

At the finishing spot 20, each judge on each lane holds the stop-watch 12 connected to the host computer 10, and pushes the stop-watch once when a runner arrives at the finish line to thereby transmit a signal to the host computer 10. It is ideal to push the stop-watch 12 for the number of times accurately correspondng to the number of the runners, at every time the pariticpant runners come into the goal (this manner of pushing the stop-watch will hereinafter be called "ordinary pushing"). However, it may happen, depending on the situation, that one and same judge pushes the stop-watch twice or more for one runner (this will hereinafter be called "plural pushing"), or, on the contrary, the judge forgets to push the stop-watch 12 in spite of the runner has arrived at the finish line (this will hereinafter be called "foregotten pushing").

The runners who have arrived at the finish line continue to move forward from the finish line along their lanes up to the bar code reading spot where they have their own racing number on the bar code 8 read by other judges holding the bar code reader 11 and standing-by at the bar code reading spot. The thus read out data are stored, as inputs, into the host computer 10 together with the time as read (which can be measured by the timers incorporated in the host computer). As has already been explained, since there is no change in the sequence of the runners from the finish line to the bar code reading spot, it is possible, in the case of the "ordinary pushing", to determine to whom the time as measured by the stop-watch belongs. When this control system is adopted for each lane, difference in the arrival time of the runners coming into the finish line on different lanes can also be determined (it is determined by which one of the stop-watches on the lanes was pushed earlier). This difference determination system is designed to be controlled entirely by the computer program in the host computer 10.

In the case, however, of the "plural pushing" or the "foregotten pushing", frequency of measuring the racing time by the stop-watch 12 differ from that of measurement by the bar code reader 11. Explaining the case of the plural pushing in more detail, with the runners on the lane A as an example, if the stop-watch 12 is pushed twice for each of the runners $a_1$ and $a_2$, there will be four racing times in total to be measured by pushing the stop-watch 12, as shown by the racing time I, II, III and IV in Table 1 below.

TABLE 1

| | Racing Time (by stop-watch) | | Bar Code Reading Time | | Assumed Racing Time | |
|---|---|---|---|---|---|---|
| $a_1$ | I | 1:10:20 | V | 1:10:25 | VII | 1:10:20 |
| | II | 1:10:21 | | | | |
| $a_2$ | III | 1:10:50 | VI | 1:10:56 | VIII | 1:10:51 |
| | IV | 1:10:51 | | | | |

(The idle racing time is set at 5 sec.)

In the above Table 1, the racing times I, II and III, IV were respectively recorded for the runners $a_1$ and $a_2$. Since there are four racing times for these two runners, it becomes necessary that the accurate racing time should be chosen from these four.

If the racing time of these two runners $a_1$ and $a_2$ is to be determined not by the method of the present invention, the racing time I is chosen for the runner $a_1$ and the racing time II for the runner $a_2$, which are contradictory to the fact.

According to the present invention, since the two runners are recorded as having passed the finish line, it is determined that two out of the four racing times I through IV as stored in the computer should be the accurate racing time, and the remaining two should be eliminated from the memory of the computer as being errors due to the double pushing of the stop-watch. Which one of the four racing times I through IV is to be selected as the accurate time is effected, as shown in Table 1 above, by comparison between the racing time measured by pushing the stop-watch and the assumed racing time obtained by subtraction of the pre-established idle running time (5 seconds) from the bar code reading time. This selection can be automatically done by the program in the host computer. As in this embodiment, however, when the frequency of storing the bar code reading time in the computer is less than the frequency of storing the racing time, an earlier time (in the case of the double pushing, the earlier time is usually the actual racing time) is chosen from those around the assumed racing time VII (the way how to establish the time error will depend on the size of the racing). Thus, the racing time I is chosen for the runner $a_1$ and the racing time III is chosen for the runner $a_2$, the remaining two racing times II and IV being eliminated as the errors due to the double pushing.

In the following, explanations will be give as to the case of the foregotten pushing. On the lane B of FIG. 3, when the judge forgets to push the stop-watch in spite of the runner $b_1$ has passed the finish line 20, the time as stored in the computer will be as shown in Table below.

TABLE 2

| | Racing Time | Bar Code Reading Time | Assumed Racing Time |
|---|---|---|---|
| $b_1$ | — | 1:11:30 | 1:11:25 |

(The idle racing time is set at 5 sec.)

As seen from Table 2, no racing time has been measured, in spite of the bar code reading time having been recorded. In this case, the racing time for the runner $b_1$ is regarded as being the assumed racing time.

The manner, in which the sequence of arrival and the racing time is notified to each of the completed runners, or a certificate of complete running is issued to each of them, is as shown in FIG. 1, wherein those data concerning the sequence of arrival, the racing time, etc. of the completed runners as stored in the host computer 10 are printed out by a printer 14 to be given to the runners as "the official notification", or those data are printed on hard format paper to be awarded to them as "the certificate" 15.

It may also be feasible that various climatic data (such as weather, wind direction, temperature, humidity, etc. on the day of the racing event, reference racing time such as the racing time of the victor, distribution of the racing time, etc.), and other data be recorded, calculated, and stored in the host computer 10, which will be printed out depending on necessity. Further, for the purpose of health control, the physical conditions of the participants (such as blood pressure, pulse, weight, etc.) are measured by instruments (all being connected to the host computer 10) at the racing site before or after the event, and these data are stored as inputs in the computer. These data may also be added in the certificate of complete running. Such arrangement is considered to be highly useful in the management and operation of the racing event, with the highly aging society before us.

As has been described in the foregoing, since the present invention provides the improved method of determining the racing time and the sequence of arrival of the runners, not only accurate measurement and determination of the racing time and the sequence of arrival of the runners are made possible, but also very efficient management and operation can be secured in the ground event where a large number of runners take part in.

I claim:

1. A method for determining the sequence of arrival and/or the racing time of a large number of participants in a racing event, which comprises steps of:
    assigning a respective distinct bar-code to each participant;
    providing individual bar code labels bearing the bar-coded racing number thereon to be carried by each participant;
    providing a computer having a preset idle running time corresponding to an idle running zone located after a designated racing event finish line and before a designated bar code reading line, wherein, participants who have passed the finish line must continue to run to said bar code reading line;
    transmitting a respective timer-triggering signal each time one of said participants passes said finish line to the computer which incorporates therein at least one timer tracking the elapsed time of said racing event;
    storing in said computer a sequential plurality of racing times corresponding to said timer-triggering signals;
    sequentially reading at said reading line the bar code label of each participant by means of bar code readers;
    storing in said computer in corresponding relationship the reading time and the corresponding bar code; and
    determining an assumed racing time of each finishing participant by subtracting said idle time from said reading time as stored in the computer to arrive at an assumed racing time;
    correlating said sequence of assumed racing times with said sequence of racing times, thereby determining an official racing time of each and every finishing participant runner.

2. The method of claim 1, wherein said correlating step includes:
    eliminating excess racing times not corresponding to an assumed racing time;
    accepting an assumed racing time as said official racing time when no racing time corresponds to said assumed racing time.

* * * * *